United States Patent
Lulofs et al.

[19]

[11] Patent Number: 5,938,960
[45] Date of Patent: Aug. 17, 1999

[54] TIMER WITH ADJUSTABLE TIME CONTROL BASED ON AN RC OSCILLATOR WITH A VARIABLE RESISTOR, AND TOASTER INCLUDING SUCH A TIMER

[75] Inventors: Klaas J. Lulofs; Tjerk Bij De Leij, both of Drachten, Netherlands

[73] Assignee: U.S. Philips Corporation, New York, N.Y.

[21] Appl. No.: 09/115,785

[22] Filed: Jul. 14, 1998

[30] Foreign Application Priority Data

Jul. 17, 1997 [EP] European Pat. Off. ............... 97202250

[51] Int. Cl.$^6$ ...................................................... H05B 1/02
[52] U.S. Cl. ......................... 219/492; 219/519; 219/501; 219/518; 99/329 R
[58] Field of Search .................................. 219/518, 519, 219/514, 502, 492, 493, 497, 501; 99/329 RT, 328, 329 P, 329 R

[56] References Cited

U.S. PATENT DOCUMENTS

| | | | |
|---|---|---|---|
| 4,170,932 | 10/1979 | Lancette | 219/502 |
| 4,376,243 | 3/1983 | Renn et al. | 214/519 |
| 5,402,708 | 4/1995 | Krasznai et al. | 99/328 |
| 5,672,288 | 9/1997 | Tran | 219/502 |

*Primary Examiner*—Mark Paschall
*Attorney, Agent, or Firm*—Ernestine C. Bartlett; Leroy Eason

[57] ABSTRACT

An RC oscillator having an oscillation frequency which is controllable by supplying a step voltage signal to a series arrangement of a capacitor and a resistor, the oscillation frequency being dependent on the time for the capacitor to be charged to a given voltage level. In order to vary the frequency, the amplitude of the supplied step voltage is varied instead of the resistance of the resistor via which the capacitor is charged. The amplitude variation can be provided, for example, by a potentiometer which acts as a voltage divider for the step voltage. The tolerance of the potentiometer in regard to its resistance value will not be relevant, because it is only the ratio between different portions thereof which is determinative. The step voltage, and consequently the oscillation frequency, will be proportional to the setting of the potentiometer regardless of the resistance tolerance thereof.

5 Claims, 3 Drawing Sheets

TIMER WITH ADJUSTABLE TIME CONTROL BASED ON AN RC OSCILLATOR WITH A VARIABLE RESISTOR, AND TOASTER INCLUDING SUCH A TIMER

BACKGROUND OF THE INVENTION

The invention relates to an RC oscillator having a controllable oscillation frequency, comprising: a series arrangement of a capacitor and resistor, and a signal source for supplying a step voltage signal to the series arrangement, the oscillation frequency in operation being dependent upon the time for charging the capacitor has been charged to a given voltage.

The invention further relates to an electric toaster having an electric heating element, means for connecting the heating element to an electric power source, and an adjustable timer for disconnecting the heating element from the electric power source after an adjustable time interval, the adjustable timer including said RC oscillator.

Such an RC oscillator and toaster are known from, for example, U.S. Pat. No. 5,402,708. This known toaster has a timer by means of which the toasting time can be set. The timer comprises an RC oscillator and a divider circuit which divides the comparatively high oscillation frequency of the RC oscillator to a signal having a low frequency and a period whose length is suitable for toasting. The generation of the oscillation frequency is based on the application of a step voltage to a series arrangement of a resistor and a capacitor and on subsequently waiting until the voltage across the capacitor exceeds a given threshold voltage. In the known RC oscillator the resistance is varied by means of a potentiometer so as to enable the period of the oscillation frequency to be controlled. The threshold voltage is exceeded sooner and the period becomes smaller according as the resistance decreases. Since the resistance of a potentiometer generally has a fairly large tolerance there is a comparatively large spread in the frequency generated by the RC oscillator. If such a potentiometer is now used in the timer of a toaster the toasting time obtained for a given setting of the control knob or slide of the potentiometer will differ from toaster to toaster.

SUMMARY OF THE INVENTION

It is an object of the invention to provide a solution to the problems mentioned above. To this end, the RC oscillator of the type defined in the opening paragraph is characterized in that the signal source includes control means for controlling the amplitude of the step voltage signal.

The invention is based on the recognition of the fact that it is the amplitude of the step voltage applied to the series arrangement of the capacitor and the resistor which should be varied, rather than the resistance via which the capacitor is to be charged. The amplitude can be varied in various manners, preferably by means of a potentiometer which operates as voltage divider for the step voltage. The tolerance of this potentiometer is not relevant because it is now the ratio between two equally inaccurate resistances which matters. The step voltage, and hence the oscillation frequency, are now directly proportional to the setting of the potentiometer, regardless of its tolerance.

The amplitude of the step voltage can also be adjusted in other ways, for example by means a resistor in series with a zener diode which, by means of a switch, is selected from a group of at least two zener diodes having different zener voltages. In this way, it is possible to generate a number of discrete step voltages.

The RC oscillator in accordance with the invention is suitable for timers in general but particularly for electrical appliances which should be turned off after a given time, such as toasters, sunbeds and the like.

BRIEF DESCRIPTION OF THE DRAWINGS

These and other aspects of the invention will be described and elucidated with reference to the accompanying drawings, in which.

In these Figures like parts bear the same reference symbols.

DESCRIPTION OF THE PREFERRED EMBODIMENTS

Figure 1:
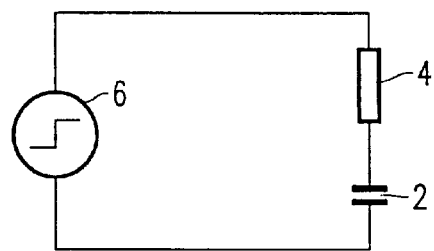
FIG. 1 is a circuit diagram illustrating the principle of an RC oscillator in accordance with the invention.

FIG. 1 shows the circuit diagram illustrating the basic principle of an RC oscillator. A capacitor 2 is charged via a resistor 4 by applying a step voltage Us from a voltage source 6. As soon as the voltage across the capacitor 2 has reached a threshold value the capacitor 2 is discharged either by means of a switch, as is customary in timer ICs of the type "555", or in that the step voltage Us is inverted as is customary in timers of the type "4060". The time constant of the series arrangement of the capacitor 2 and the resistor 4 determines the frequency of the RC oscillator. In timers having a timing range of the order of seconds or minutes it is customary to reduce the oscillation frequency by means of a frequency divider.

Figure 2:
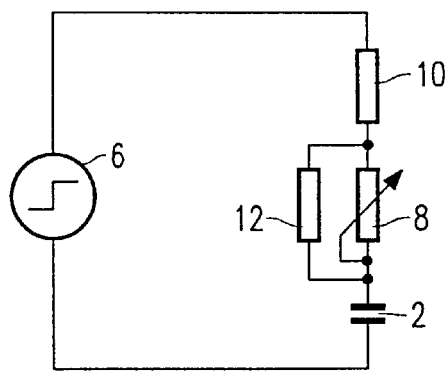
FIG. 2 is a circuit diagram of a prior-art variable RC oscillator.

As is known from the prior art and is shown in FIG. 2, the frequency can be varied by making the resistance of the resistor 4 adjustable. The resistor 4 in the circuit diagram of FIG. 2 has been replaced by a fixed resistor 10, a variable resistor 8 arranged in series with this fixed resistor, and a fixed resistor 12 arranged in parallel with the variable resistor 8. The variable resistor 8 is usually a rotary or sliding potentiometer, which for cost and price reasons generally exhibits a fairly large tolerance on its nominal resistance value. As a result of this, the absolute resistance value and, consequently, the time setting of the timer for a given position of the wiper of the potentiometer also have a large tolerance. Identical appliances equipped with such a timer will exhibit different time settings for the same position of the timer knob.

Figure 3:
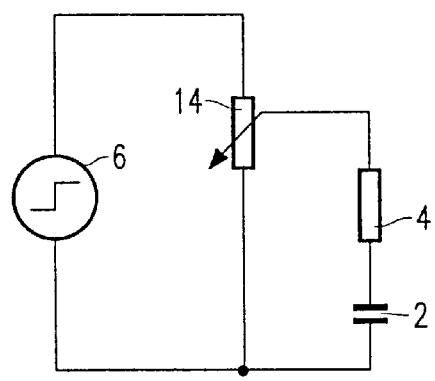
FIG. 3 is a circuit diagram of a first embodiment of a variable RC oscillator in accordance with the invention.

FIG. 3 shows a solution to this problem. The tolerance problem is solved by not making the series resistor 4 variable but the step voltage Us from the voltage source 6. A potentiometer 14 is connected across the voltage source 6 and has its wiper connected to the series arrangement of the capacitor 2 and the resistor 4. The wiper of the potentiometer 14 divides the total resistance of the potentiometer into two fractions whose resistance ratio determines the amplitude of the outgoing step voltage. The resistance ratio is only determined by the mechanical position of the wiper. Thus, the influence of the tolerance of the variable resistor is eliminated.

Figure 4:
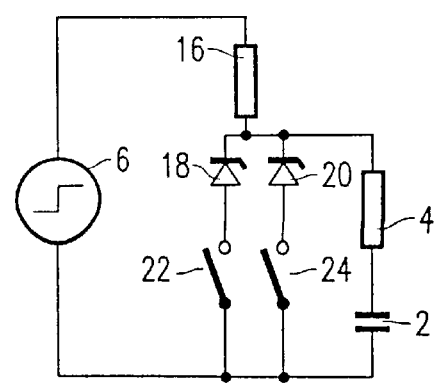
FIG. 4 is a circuit diagram of a second embodiment of a variable RC oscillator in accordance with the invention.

FIG. 4 shows a variant in which the step voltage Us from the voltage source 6 is varied by means of a resistor 16 in series with a zener diode. By means of respective selector switches 22 and 24 the zener diode can be selected from a group of at least two zener diodes 18 and 20 having different zener voltages. The zener diodes limit the step voltage to different values. The smaller the zener voltage, the longer it takes before the capacitor 2 is charged to the required threshold voltage and the lower the oscillation frequency is.

Figure 5:
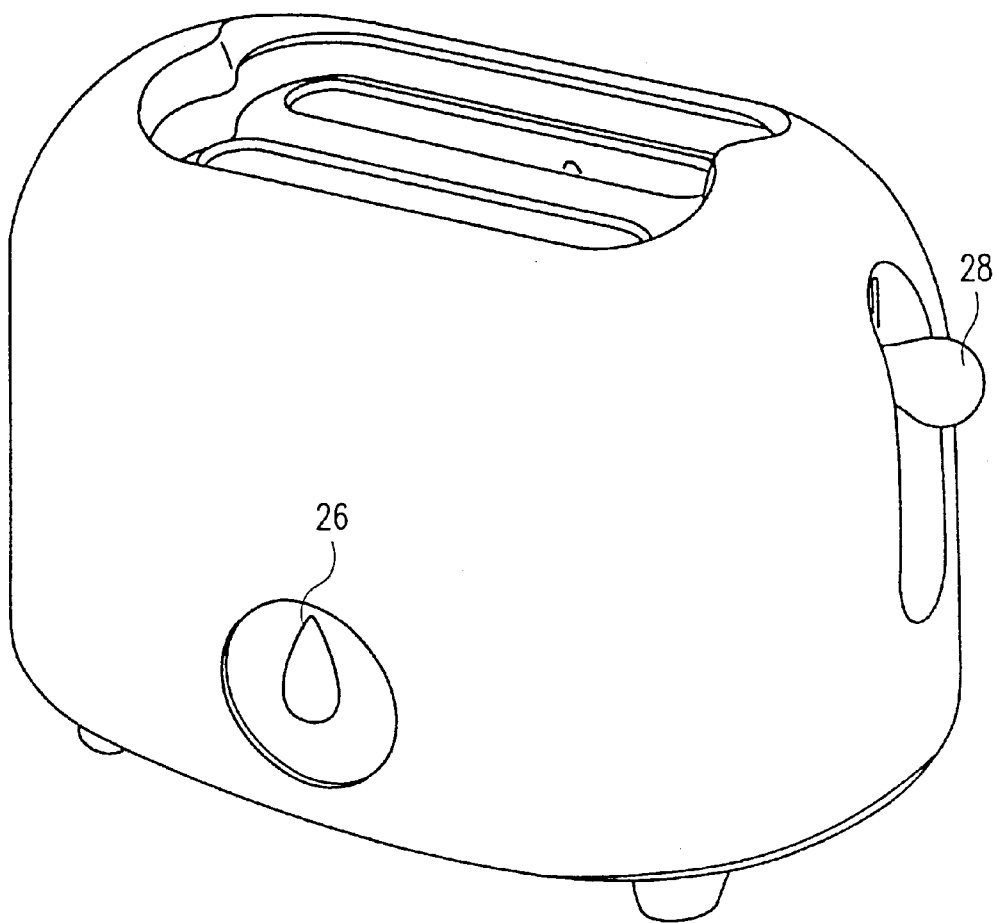
FIG. 5 shows a toaster having a timer based on a variable RC oscillator in accordance with the invention.

FIG. 5 shows a toaster having an adjustable toasting time. The toasting time is adjustable by means of a rotary knob 26 mounted on the spindle of the potentiometer 14. Toasting is started by pushing down a handle 28, which lowers the bread into the toasting chamber and also activates the timer circuit of the toaster.

Figure 6:
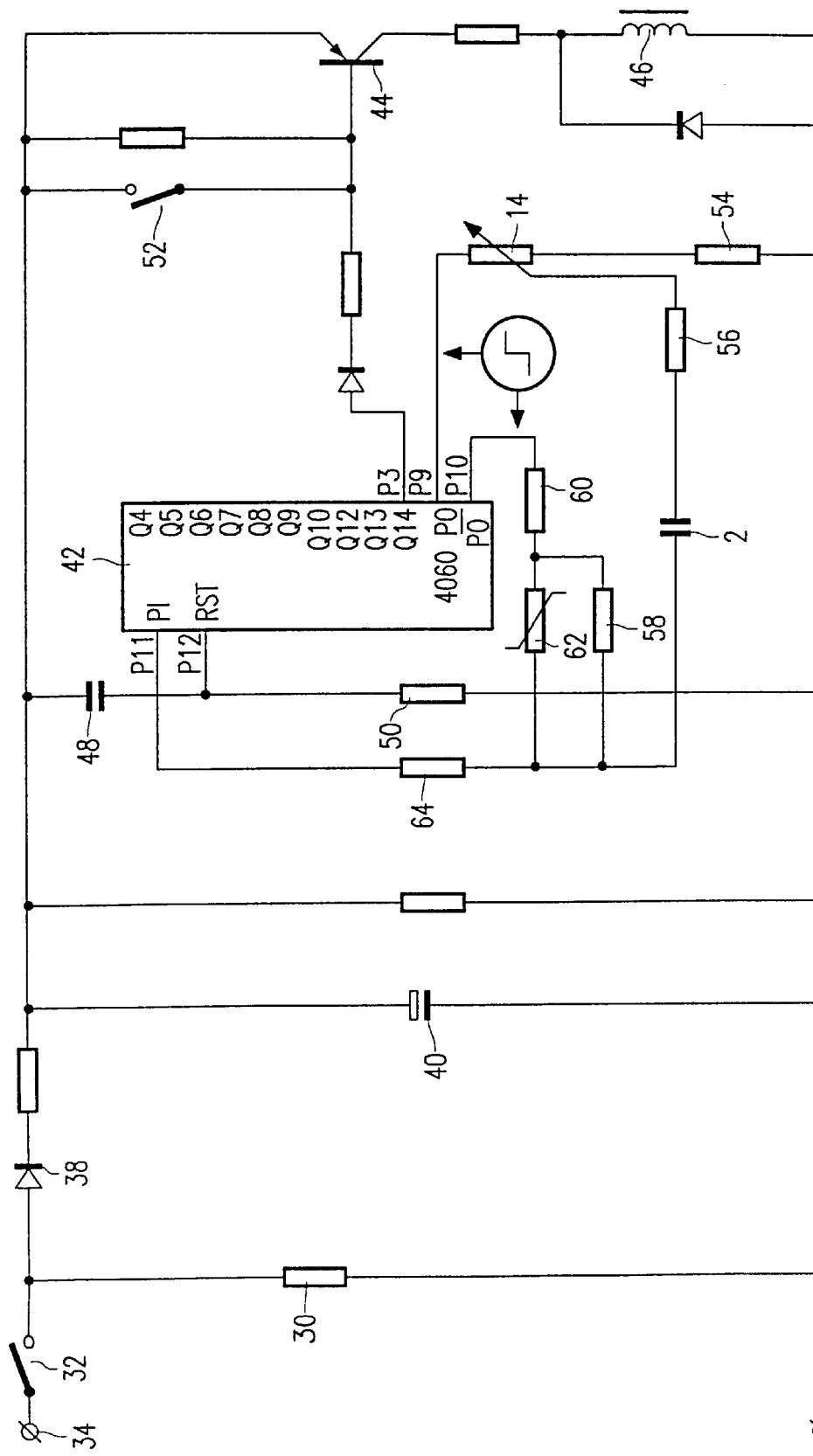
FIG. 6 is a circuit diagram of the toaster shown in FIG. 5.

FIG. 6 shows the circuit diagram of the timer circuit of the toaster. The toaster has an electric heating element 30, which can be connected to the a.c. mains terminals 34 and 36 via a switch 32. The switch 32 is closed when the handle 28 (see FIG. 5) is in its fully lowered position. The alternating voltage across the heating element 30 is rectified by means of a diode 38 and a smoothing capacitor 40 to provide the supply voltage for a timer IC 42 of the type HEF 4060 (14-Stage Ripple-Carry Binary Counter/Divider and Oscillator) available from Philips Semiconductors or of a similar type. The timer IC 42 drives a coil 46 via a PNP transistor 44, which coil locks the handle 28 until the time set by means of the knob 26 (see FIG. 5) has expired. The handle is then unlocked. As a result of this, the switch 32 is opened and the handle 28 moves upward automatically.

The timer IC 42 is reset at a pin p12 by means of a capacitor 48 and a resistor 50, as a result of which the output at a pin p3 goes low and the PNP transistor 44 is turned on, causing the coil 46 to be energized. By means of a switch 52 the base-emitter junction of the PNP transistor 44 can be short-circuited so as to enable the toasting process to be terminated prematurely. The timer IC 42 includes an inverter having an input connected to a pin p10 and having an output connected to a pin p9. In operation the output p9 carries a step voltage which is variable by means of the potentiometer 14 and a limiting resistor 54 between the pin p9 and signal ground. The variable step voltage on the wiper of the potentiometer 14 is fed back to the input p10 of the inverter via a series arrangement of the capacitor 2 and resistors 56, 58 and 60, a temperature-sensitive resistor 62 being arranged in parallel with the resistor 58 so as to provide a correction for a cold and warm operating condition of the toaster. Furthermore, a resistor 64 is connected between a pin p11 of the timer IC 42 and the node between the capacitor 2 and the resistor 58. For the purpose of the resistor 64 and for further details about the timer IC 42 reference is made to the relevant manufacturer's data sheets.

After a reset via the pin p12 the internal counter of the timer IC 42 counts the number of periods of the RC oscillator. After some time, adjustable by means of the potentiometer 14, the output at the pin p3 goes high, as a result of which the PNP transistor 44 is turned off. The coil 46 then no longer receives any energizing current, so that the toaster is switched off.

The timer circuit can be used as a self-contained unit or it can be incorporated in electrical appliances. Obviously, the timer circuit is not only suitable for use in toasters but in all kinds of other appliances which should be turned off automatically after of an adjustable time, such as sunbeds, ovens and the like.

We claim:

1. An RC oscillator having a controllable oscillation frequency, comprising:

a series arrangement of a capacitor and a resistor; and a signal source for supplying a step voltage signal to said series arrangement, the oscillation frequency being dependent upon the time for the step voltage signal to charge the capacitor to a given threshold voltage level;

characterized in that the signal source includes control means for controlling the amplitude of the step voltage signal and thereby controlling the time for the capacitor to charge to said threshold voltage level.

2. An RC oscillator as claimed in claim 1, wherein the signal source comprises an adjustable voltage divider for applying a selected proportion of the supplied step voltage signal to said series arrangement.

3. An RC oscillator as claimed in claim 2, wherein the adjustable voltage divider is a potentiometer having a wiper coupled to the series arrangement.

4. An RC oscillator as claimed in claim 2, wherein the adjustable voltage divider is in the form of a further series arrangement of a further resistor and a zener diode selected from a plurality of parallel connected zener diodes having different zener voltages, selection of any particular one of the zener diodes being provided by respective switches connected thereto, the first-mentioned series arrangement being coupled to a node between said further resistor and the parallel connected zener diodes.

5. An electric toaster comprising: an electric heating element, switching means for connecting the heating element to an electric power source, an adjustable timer for disconnecting the heating element from the electric power source after an adjustable time period, and means including an RC oscillator for providing said adjustable time period; said RC oscillator comprising:

a series arrangement of a capacitor and a resistor;

a signal source for supplying a step voltage signal to the series arrangement, said RC oscillator having an oscillation frequency which is dependent on the time for the step voltage signal to charge the capacitor to a given threshold voltage level; and control means for controlling the amplitude of the step voltage signal, thereby controlling the time for the capacitor to charge to said threshold voltage level.

* * * * *